United States Patent [19]

Luther

[11] Patent Number: 5,241,338
[45] Date of Patent: Aug. 31, 1993

[54] PHOTOGRAPHIC CAMERA WITH LABYRINTH LIGHT-TRAP FOR DEPLOYABLE LENS HOLDER

[75] Inventor: George L. Luther, Penfield, N.Y.
[73] Assignee: Eastman Kodak Company, Rochester, N.Y.
[21] Appl. No.: 909,349
[22] Filed: Jul. 6, 1992
[51] Int. Cl.$^5$ .............................................. G03B 17/02
[52] U.S. Cl. ........................................ 354/288; 354/202
[58] Field of Search ................................. 354/288, 202

[56] References Cited

U.S. PATENT DOCUMENTS 4,721,972  1/1988  Wakabayashi .................. 354/195.1
4,961,085  10/1990  Cho et al. ........................ 354/295

Primary Examiner—Monroe H. Hayes
Attorney, Agent, or Firm—Roger A. Fields

[57] ABSTRACT

A photographic camera comprises a camera body having a front opening, a lens holder, and mounting means located inside the camera body for supporting the lens holder to move the lens holder through the front opening into and out of the camera body. The mounting means cooperates with the lens holder to form a single labyrinth which prevents ambient light that may enter the front opening substantially from reaching a film plane inside the camera body. According to the invention, covering means is arranged in surrounding relationship with the lens holder and extends through the front opening for cooperating with the lens holder to form a second labyrinth that augments the single labyrinth to further prevent ambient light from reaching the film plane.

4 Claims, 4 Drawing Sheets

PHOTOGRAPHIC CAMERA WITH LABYRINTH LIGHT-TRAP FOR DEPLOYABLE LENS HOLDER

BACKGROUND OF THE INVENTION

1. Field of the Invention

The invention relates generally to the field of photography, and in particular to photographic cameras. More specifically, the invention relates to a light trap for a deployable or extendable lens holder in a photographic camera.

2. Description of the Prior Art

Prior art U.S. Pat. No. 4,721,972, issued Jan. 26, 1988, discloses a photographic camera having a lens holder that is movable through a front opening in the camera body into and out of the camera body. This type of lens holder is commonly referred to as a "deployable" or "extendable" one. To prevent ambient light from leaking into the camera body through the front opening at a gap between the camera body and the lens holder and reaching unexposed film inside the camera body, there is provided a light-intercepting packing in the gap. However, the light-intercepting packing may not entirely fill the gap, in which instance ambient light may leak through the gap to the film.

Prior art U.S. Pat. No. 4,961,085, issued Oct. 2, 1990, discloses a photographic camera having mounting means located inside the camera body for supporting a lens holder to move the lens holder through a front opening in the camera body and for cooperating with the lens holder to form a single labyrinth which appears to prevent ambient light that may enter the front opening substantially (but not completely) from reaching unexposed film inside the camera body.

SUMMARY OF THE INVENTION

The invention solves the problem of light leakage possible in the camera designs disclosed in prior art U.S. Pat. Nos. 4,721,972 and 4,961,085.

According to the invention, a photographic camera comprising a camera body having a front opening, a lens holder, and mounting means located inside the camera body for supporting the lens holder to move the lens holder through the front opening into and out of the camera body and for cooperating with the lens holder to form a single labyrinth which prevents ambient light that may enter the front opening substantially from reaching a film plane inside the camera body, is characterized by:

covering means arranged in surrounding relationship with the lens holder and extending through the front opening for cooperating with the lens holder to form a second labyrinth that augments the single labyrinth to further prevent ambient light from reaching the film plane.

DETAILED DESCRIPTION OF THE PREFERRED EMBODIMENT

The invention is disclosed as being embodied in a 35 mm still camera. Because the features of this type of camera are generally well known, the description which follows is directed in particular to elements forming part of or cooperating directly with the preferred embodiment. It is to be understood, however, that other elements not specifically shown or described may take various forms known to persons of ordinary skill in the art.

Figure 1:
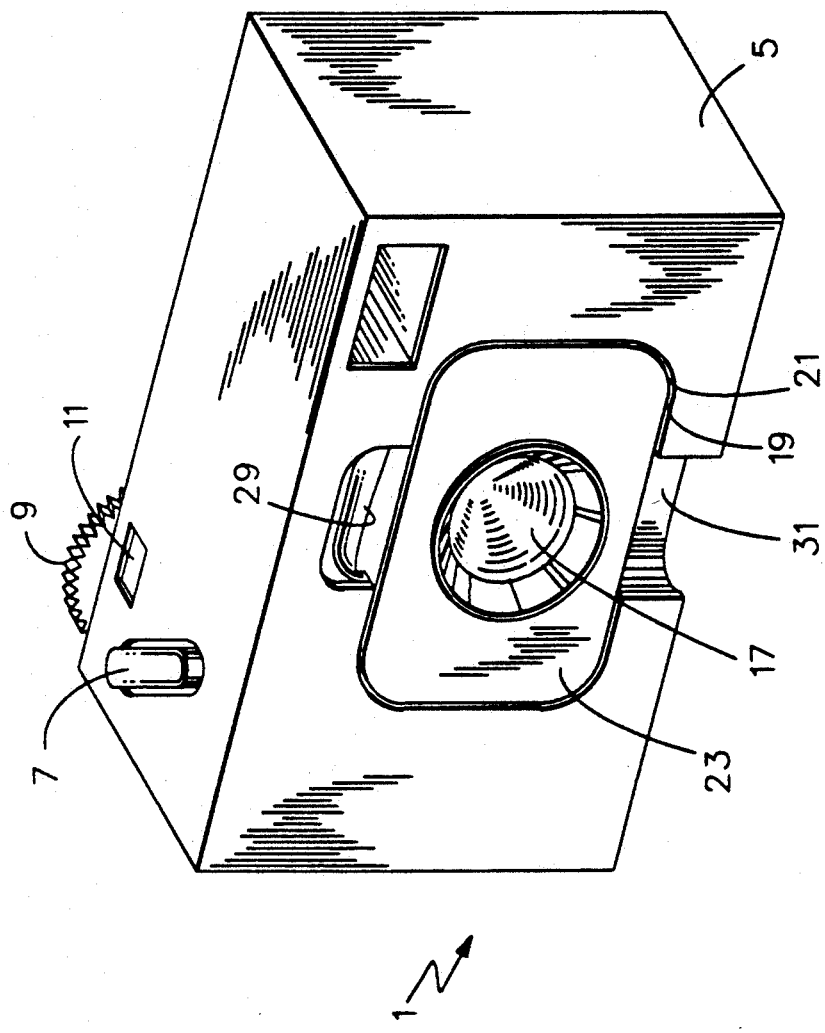
FIG. 1 is a perspective view of a photographic camera with a deployable lens holder according to a preferred embodiment, showing the lens holder in a storage or retracted position.
Figure 2:
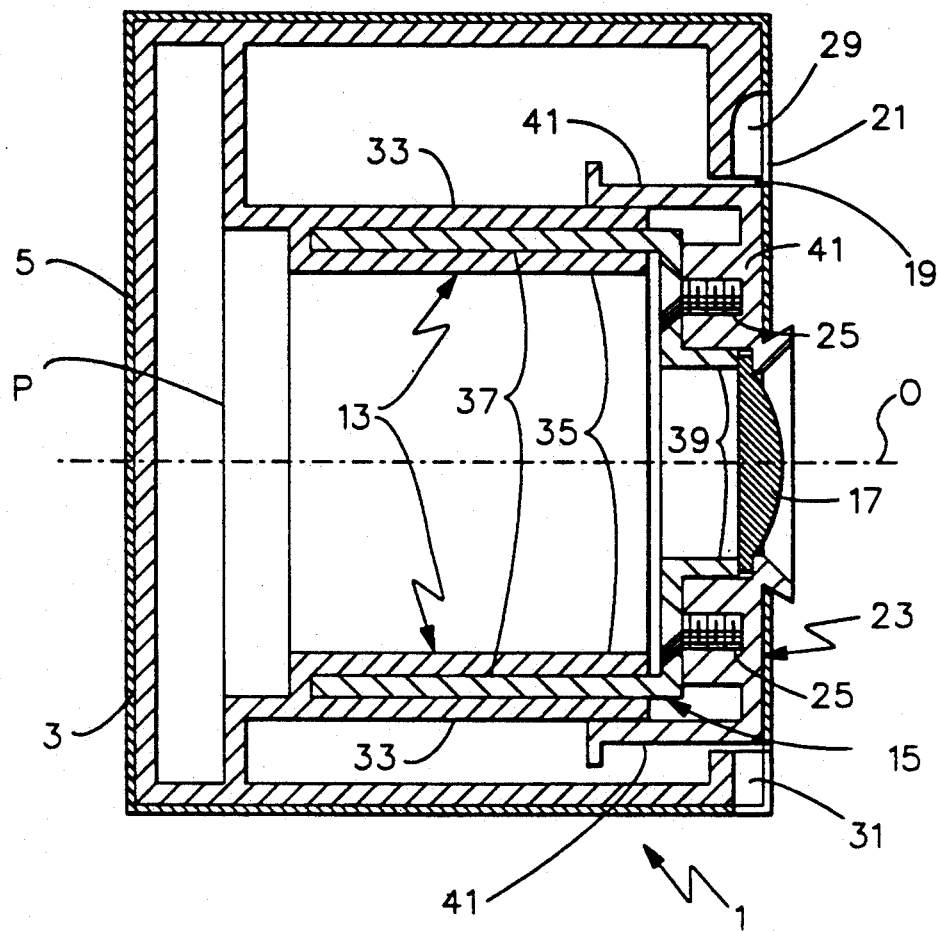
FIG. 2 is a sectional view of the photographic camera as shown in FIG. 1.

Referring now to the drawings, FIGS. 1 and 2 depict a disposable single-use 35 mm still camera 1 comprising a plastic interior camera body 3 and a cardboard exterior packing 5. At the manufacturer, the camera body 3 is loaded with a conventional 24-exposure 35 mm film cartridge and substantially the entire length of the unexposed filmstrip within the cartridge is factory prewound from the cartridge onto a take-up spool (not shown) inside the camera body. After the user takes a picture by depressing a shutter release button 7, a thumb-wheel 9 is manually rotated to rewind the exposed frame of the filmstrip into the cartridge. The rewinding movement of the filmstrip the equivalent of one frame rotates a metering sprocket (not shown) inside the camera body 3 to decrement a frame counter 11 to its next lower number setting. When substantially the entire length of the filmstrip is exposed and rewound into the cartridge, the single-use camera 1 is sent to a photofinisher who first removes the camera body 3 from the exterior packing 5 and then removes the cartridge from the camera body. The exposed filmstrip is then removed from the cartridge for processing and the camera body 3 is recycled.

Figure 3:
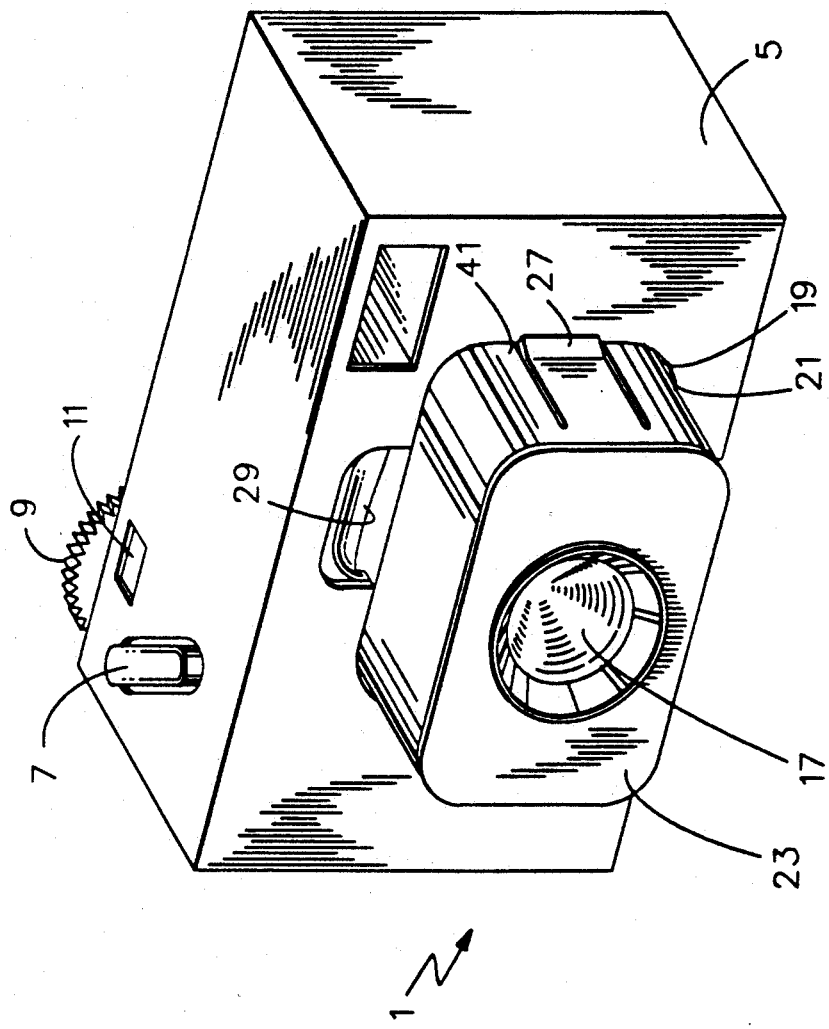
FIG. 3 is a perspective view of the photographic camera with the lens holder shown in a picture-taking or extended position.
Figure 4:
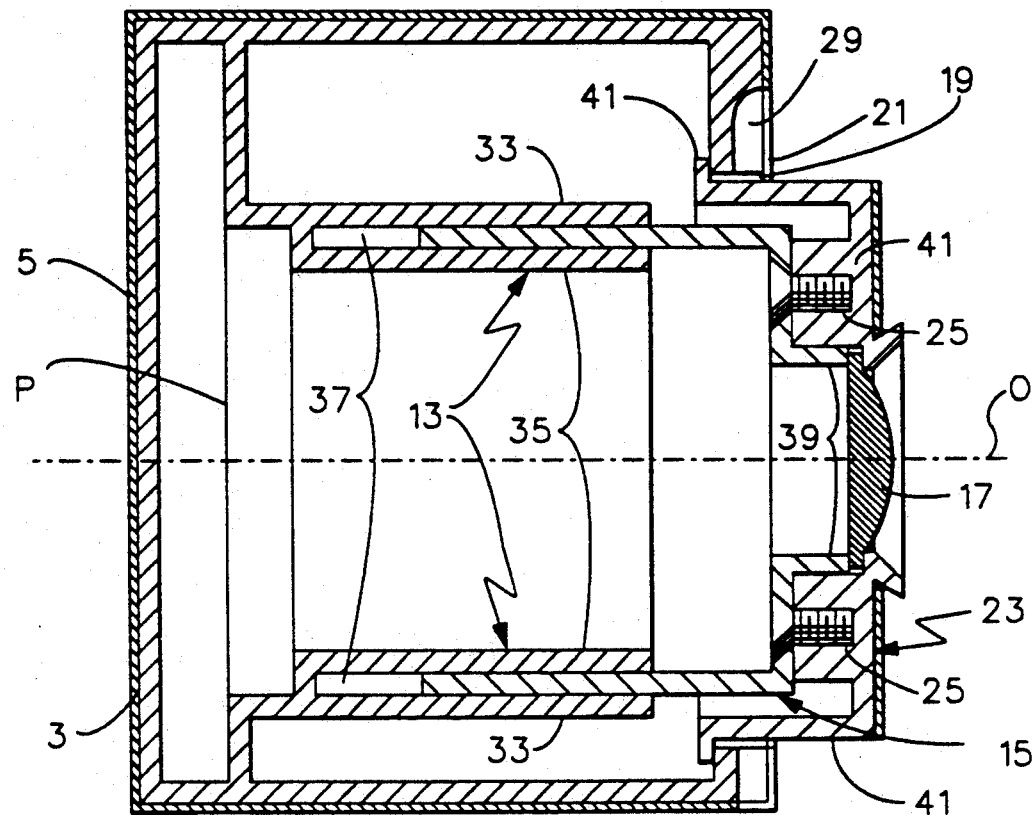
FIG. 4 is a sectional view of the photographic camera as shown in FIG. 3.

Mounting means 13 is fixed inside the camera body 3 for supporting a lens holder or barrel 15 to move along the optical axis 0 of a picture-taking lens 17, through respective aligned front openings 19 and 21 in the camera body and the exterior packing 5, between a storage or retracted position shown in FIGS. 1 and 2 and a picture-taking or extended position shown in FIGS. 3 and 4. A cover or skirt 23 for the lens holder 15 is connected to the lens holder via several screws 25 to hold the picture-taking lens 17 between the cover and the lens holder. See FIGS. 2 and 4. A pair of opposite, resilient, locking detents 27 (only one shown) are integrally formed with the cover 23 to engage the camera body 3 when the lens holder 15 is in its extended position, to temporarily secure the lens holder in that position. To disengage the locking detents 27 from the camera body 3, they are manually squeezed inwardly, i.e. towards each other. Then the lens holder 15 with the cover 23 can be manually pushed from its extended position to its retracted position. A pair of finger recesses 29 and 31 are contoured in the camera body 3 to enable the cover 23 to be manually grasped in its retracted position to pull the lens holder 15 with the cover to its extended position.

The mounting means 13 is a double-walled mount having a continuous (four-sided) outer support wall 33 and a continuous (four-side) inner support wall 35 separated by a continuous space or gap 37 as shown in FIGS. 2 and 4. The lens holder 15 includes a continuous (four-sided) holder wall 39 that longitudinally extends into the continuous space 37 to cooperate with the continuous outer and inner support walls 33 and 35 to define a single labyrinth which prevents ambient light that may enter the front opening 19 in the camera body 3 substantially from reaching a film plane P inside the camera body. The cover 23 for the lens holder 15 includes a continuous (four-sided) covering wall 41 that longitudinally extends through the front openings 19 and 21 in the camera body 3 and the exterior packing 5 to surround the continuous holder wall 39 (and optionally the continuous outer support wall 33) to define a second labyrinth that augments the first labyrinth to further prevent ambient light from reaching the film plane P. See FIGS. 2 and 4.

The invention has been described with reference to a preferred embodiment. However, it will be appreciated that variations and modifications can be effected within the ordinary skill in the art without departing from the scope of the invention.

I claim:

1. A photographic camera comprising a camera body having a front opening, a lens holder, and mounting means located inside said camera body for supporting said lens holder to move the lens holder through said front opening into and out of the camera body and for cooperating with the lens holder to form a single labyrinth which prevents ambient light that may enter the front opening substantially from reaching a film plane inside the camera body, is characterized by:

covering means arranged in surrounding relationship with said lens holder and extending through said front opening for cooperating with the lens holder to form a second labyrinth that augments said single labyrinth to further prevent ambient light from reaching said film plane.

2. A photographic camera as recited in claim 1, wherein said mounting means includes a continuous outer support wall and a continuous inner support wall separated by a continuous space, said lens holder includes a continuous holder wall extending into said space to cooperate with said outer and inner support walls to form said single labyrinth, and said covering means includes a continuous covering wall surrounding said continuous holder wall to form said second labyrinth.

3. A photographic camera as recited in claim 1 or 2, wherein said covering means is connected to said lens holder to move with the lens holder through said front opening.

4. A photographic camera as recited in claim 3, wherein said lens holder and said covering means hold a taking lens between one another.

* * * * *